(12) United States Patent
Hsu

(10) Patent No.: US 10,955,975 B2
(45) Date of Patent: Mar. 23, 2021

(54) LIGHTING TOUCHPAD

(71) Applicant: ELAN MICROELECTRONICS CORPORATION, Hsin-Chu (TW)

(72) Inventor: Hsin-Fu Hsu, Tainan (TW)

(73) Assignee: ELAN MICROELECTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/689,778

(22) Filed: Nov. 20, 2019

(65) Prior Publication Data

US 2020/0348774 A1 Nov. 5, 2020

Related U.S. Application Data

(60) Provisional application No. 62/842,475, filed on May 2, 2019.

(30) Foreign Application Priority Data

Jul. 8, 2019 (TW) .............................. 108123892 A

(51) Int. Cl.
*G09G 5/00* (2006.01)
*G06F 3/044* (2006.01)
*G06F 3/02* (2006.01)

(52) U.S. Cl.
CPC ............ *G06F 3/044* (2013.01); *G06F 3/0202* (2013.01)

(58) Field of Classification Search
CPC ...... G06F 3/044–3/0448; G06F 3/0412; G06F 3/047; G06F 3/0416; G06F 3/04886; G06F 3/0418; G06F 1/1692

USPC .......................................... 345/168, 173–174
See application file for complete search history.

(56) References Cited

U.S. PATENT DOCUMENTS

| | | | | |
|---|---|---|---|---|
| 2009/0114518 | A1* | 5/2009 | Lin | G06F 3/03547 200/600 |
| 2009/0250329 | A1* | 10/2009 | Yu | G06F 3/044 200/5 A |
| 2016/0111040 | A1* | 4/2016 | Kim | G02F 1/13454 345/698 |
| 2018/0196575 | A1* | 7/2018 | Yarosh | G06F 3/0418 |
| 2019/0034014 | A1* | 1/2019 | Wu | G06F 3/044 |

FOREIGN PATENT DOCUMENTS

TW 201839584 A 11/2018

* cited by examiner

*Primary Examiner* — Jennifer T Nguyen
(74) *Attorney, Agent, or Firm* — Muncy, Geissler, Olds & Lowe, P.C.

(57) ABSTRACT

A lighting touchpad includes a circuit board and a light-emitting element. The circuit board has a touch sensing area, and a plurality of first sensor cells and at least one second sensor cell are formed in the touch sensing area. Each of the first sensor cells has the same first areas, and each of the at least one second sensor cell has a second area smaller than the first area. The light-emitting element is disposed in the touch sensing area and adjacent to the at least one second sensor cell. The configuration of the present invention is helpful to reduce a touch dead zone (also be called an inactive area) of the lighting touchpad.

6 Claims, 5 Drawing Sheets

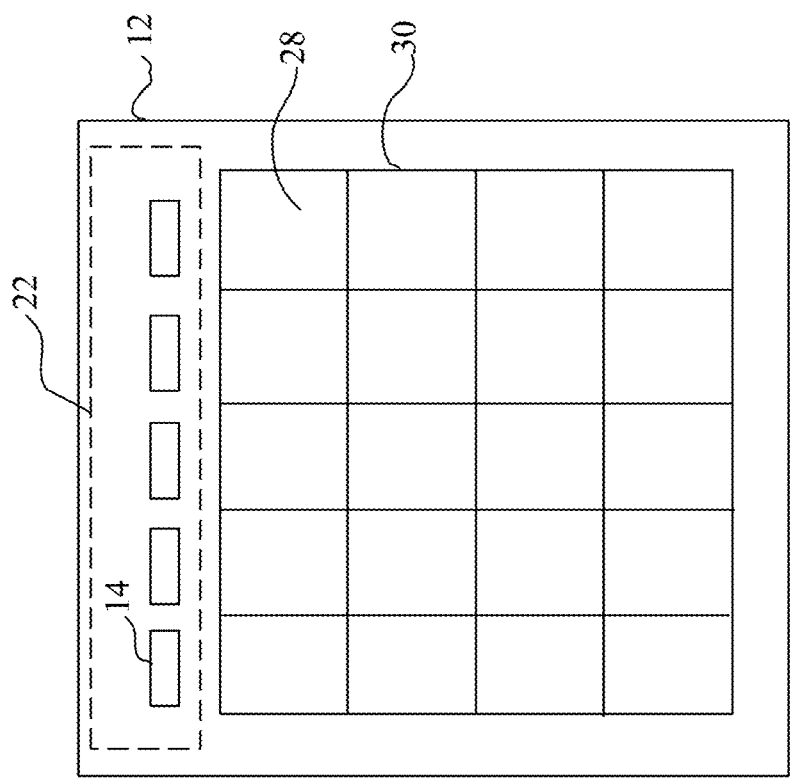
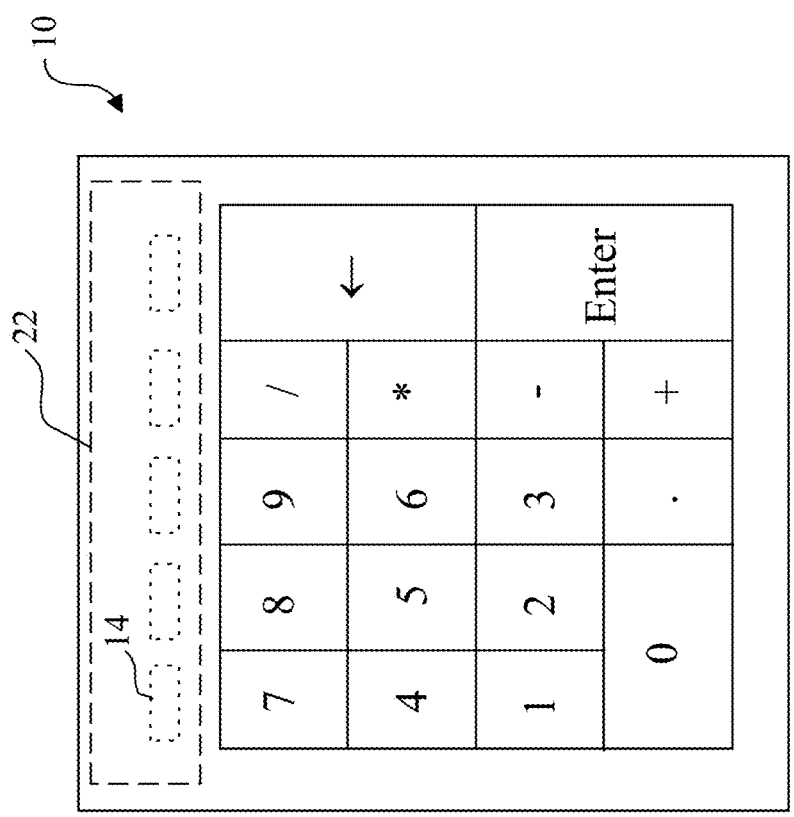
FIG. 3
FIG. 2

LIGHTING TOUCHPAD

BACKGROUND OF THE INVENTION

1. Field of the Invention

The present invention relates to a touchpad, and more particularly to a lighting touchpad.

2. Description of the Related Art

Capacitive touchpads are widely used in notebook computers or external input devices. A user can perform an input function by clicking or moving on the touchpad. If the conventional touchpad has a light-emitting function, the touchpad can have more applications.

SUMMARY OF THE INVENTION

An objective of the present invention is to provide a lighting touchpad.

Another objective of the present invention is to provide a lighting touchpad in which a light-emitting element is disposed on a touch sensing area of the lighting touchpad.

According to the present invention, a lighting touchpad comprising a circuit board and at least one light-emitting element. The circuit board has a touch sensing area comprising a plurality of sensor cells, and the at least one light-emitting element is disposed in the touch sensing area, so as to eliminate a touch dead zone of the lighting touchpad.

BRIEF DESCRIPTION OF THE DRAWINGS

The structure, operating principle and effects of the present invention will be described in detail by way of various embodiments which are illustrated in the accompanying drawings.

FIG. 2 shows a top view of a lighting touchpad.

FIG. 3 shows a top view of a circuit board in a lighting touchpad.

DETAILED DESCRIPTION OF THE PREFERRED EMBODIMENTS

Figure 1:
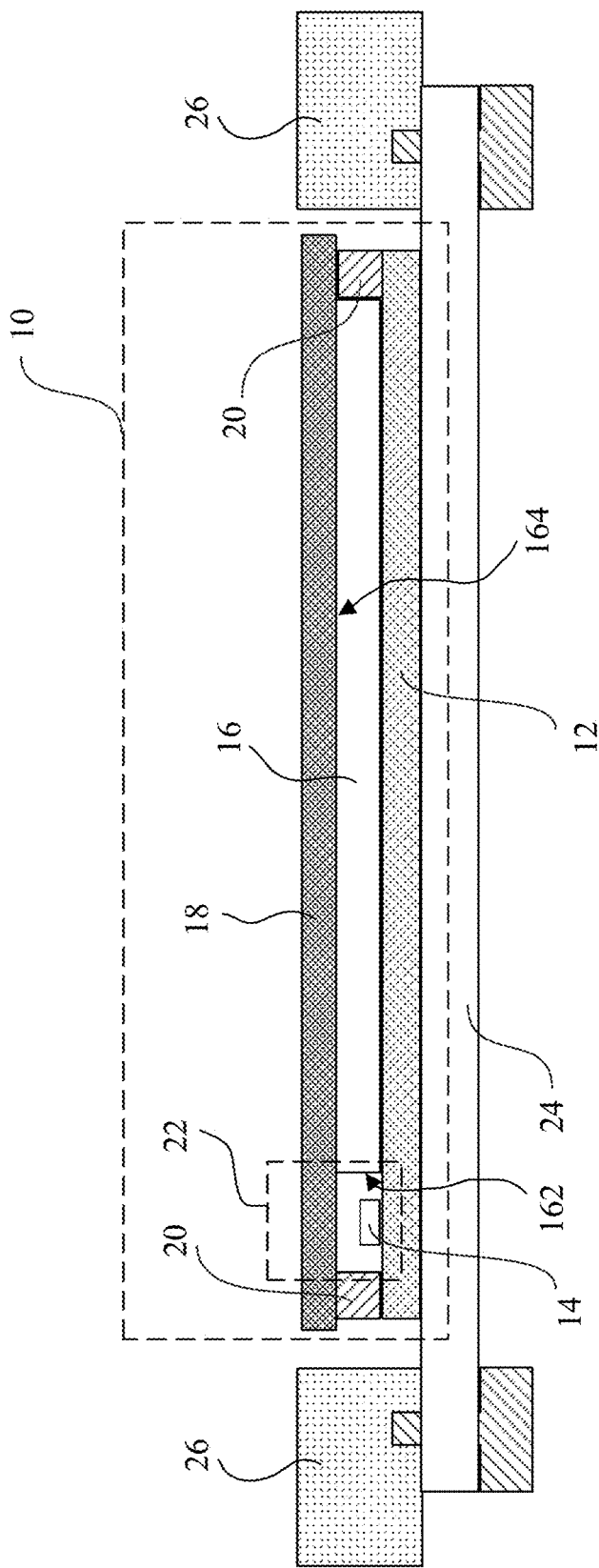
FIG. 1 shows a sectional view of a lighting touchpad used in a notebook computer.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

FIG. 1 shows a sectional view of a lighting touchpad 10 used in a notebook computer, FIG. 2 is a top view of a lighting touchpad 10, and FIG. 3 is a top view of a circuit board 12 of the lighting touchpad 10. As shown in FIG. 1, the lighting touchpad 10 is placed on a support holder 24 of the notebook computer, and is surrounded by a C component upper cover 26 (that is, a keyboard frame). The lighting touchpad 10 includes a circuit board 12, a light-emitting element 14, a light guide plate 16, a cover plate 18, and a light block element 20. As shown in FIG. 3, the lighting touchpad 10 is a capacitive touchpad. The circuit board 12 has a plurality of sensor cells 28 which form a touch sensing area 30. The touch sensing area 30 is configured to sense a touch of a finger or an object. According to a sensing value of each of the plurality of sensor cells 28, whether the lighting touchpad 10 is touched by a finger or an object and the touch position can be determined. The light-emitting element 14 is disposed on the circuit board 12 and outside the touch sensing area 30. In an embodiment, the light-emitting element 14 can be an LED (light emitting diode). The light guide plate 16 is disposed above the circuit board 12 and at a lateral side of the light-emitting element 14, and configured to guide the light emitted from the light-emitting element 14. The cover plate 18 is disposed above the light guide plate 16 and configured to cover the light-emitting element 14 and the light guide plate 16. The user can use a finger or an object (such as a stylus) to click or move on the cover plate 18, so as to input an instruction or execute a function. In an embodiment, the cover plate 18 can be made by glass or mylar. The light block element 20 surrounds the light guide plate 16 and the light-emitting element 14 on the circuit board 12, and is configured to prevent the light emitted by the light-emitting element 14 from leaking through a lateral side of the lighting touchpad 10. The light guide plate 16 has micro structures disposed on a bottom surface thereof and configured to reflect light. The light guide plate 16 comprises a light incident surface 162 and a light exit surface 164, the light emitted from the light-emitting element 14 enters the light guide plate 16 through the light incident surface 162, and is reflected by the micro structures on the bottom surface of the light guide plate 16. The reflected light generated by the micro structures leaves from the light guide plate 16 through the light exit surface 164. When the light-emitting element 14 is turned off, the lighting touchpad 10 does not show any pattern. When the light-emitting element 14 is turned on, the light of the light-emitting element 14 enters the light guide plate 16 and is reflected by the micro structures, so that the user can see a numeric keyboard pattern shown on the lighting touchpad 10, such as shown in FIG. 2, from the top of the lighting touchpad 10. In an embodiment, the micro structures disposed on the bottom surface of the light guide plate 16 can be arranged in the numeric keyboard pattern shown in FIG. 2, and the cover plate 18 is formed with transparent areas corresponding in position to the numeric keyboard pattern. When the light-emitting element 14 is turned on, the user can see the numeric keyboard pattern through the light reflected by the micro structures. In another embodiment, the cover plate 18 has the numeric keyboard pattern formed on a bottom or a surface thereof, the area of the numeric keyboard pattern is light transmittable, and the light guide plate 16 has the micro structures disposed on a bottom thereof and corresponding in position to the areas of the numeric keyboard pattern. When the light-emitting element 14 is turned on, the micro structures produce the reflected light, so that a user can see the numeric keyboard pattern on the cover plate 18.

In the lighting touchpad 10, the area 22 where the light-emitting element 14 is disposed does not include the sensor cell 28, so the area 22 is unable to perform touch sensing operation and is also called as a dead-zone. In an ideal case, any area of the lighting touchpad 10 should be able to perform touch sensing operation, so the area 22 which is unable to perform touch sensing operation is quite inconvenient for the user.

Figure 4:
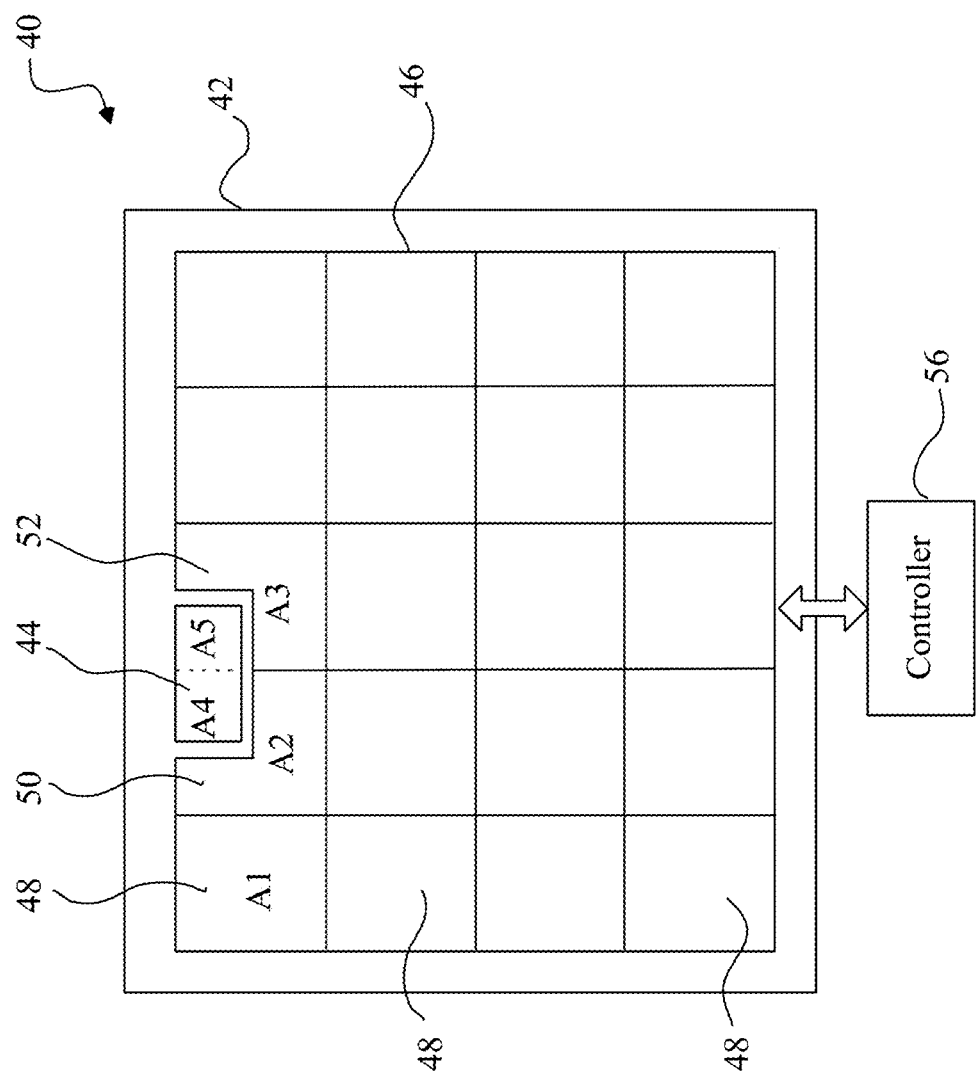
FIG. 4 shows an embodiment of a lighting touchpad of the present invention.

FIG. 4 shows an embodiment of a lighting touchpad 40 of the present invention. As shown in FIG. 4, the lighting touchpad 40 comprises a circuit board 42 and at least one light-emitting element 44. In other embodiments, the lighting touchpad 40 comprises the light guide plate 16 and the cover plate 18 disposed above the circuit board 42, as shown in FIG. 1. The descriptions of the light guide plate 16 and the cover plate 18 can refer to FIG. 1 and the related illustration, so the descriptions are not repeated herein.

The circuit board 42 includes a touch sensing area 46, a plurality of first sensor cells 48, and second sensor cells 50 and 52. The plurality of first sensor cells 48, and the second sensor cells 50 and 52 are formed in the touch sensing area 46. In this embodiment, the lighting touchpad 40 can be a capacitive touchpad. A controller 56 is coupled to each of the sensor cells 48, 50, and 52. In an embodiment, the controller 56 can also be disposed on a lower surface of the circuit board 42. The controller 56 is configured to measure the sensing value of each of the sensor cells 48, 50 and 52, so as to determine whether the lighting touchpad 40 is touched by a finger or an object, and determine a touch position. The light-emitting element 44 is disposed in the touch sensing area 46 and between the two adjacent second sensor cells 50 and 52. The plurality of first sensor cells have the same areas A1, and each of the plurality of second sensor cells 50 and 52 has an area smaller than the area A1. For example, the area of the second sensor cell 50 is A2, the area of the second sensor cell 52 is A3, and each of areas A2 and A3 is smaller than area A1. The areas A2 and A3 can be the same areas or different areas. In an embodiment, each of the areas A2 and A3 is higher than or equal to 50% of the area A1. The area A1 is the area occupied by each first sensor cell 48 in the touch sensing area 46, the area A2 is the area occupied by the second sensor cell 50 in the touch sensing area 46, and the area A3 is the area occupied by the second sensor cell 52 in the touch sensing area 46.

Compared with the first sensor cell 48, the second sensor cell 50 does not include an area A4 and the second sensor cell 52 does not include an area A5. The light-emitting element 44 is disposed in an area formed by the areas A4 and A5, and adjacent to the second sensor cells 50 and 52. As show in FIG. 4, the arrangement of the first sensor cell 48 and the second sensor cells 50 and 52 form a gap, where there is no sensor cell disposed, in the touch sensing area 46, and the gap comprises the areas A4 and A5. The light-emitting element 44 is disposed at the gap.

Compared with FIG. 3, the light-emitting element 44 is disposed in the touch sensing area 46, and the circuit board 42 is implemented without the area 22, so that the area (dead-zone) where the touch input operation cannot be performed can be significantly reduced. On the other hand, the circuit board 42 is implemented without the area 22, so the touch sensing area 46 can be larger than the area 30 of FIG. 3 and can provide a larger touch sensing area for a user to perform the touch input operation. Since the light-emitting element 44 is closely adjacent to the second sensor cells 50 and 52, and a size of a general finger is larger than the area A1, even when the finger is operated at the position of the light-emitting element 44, the finger can also cause a change in the capacitance value of at least one of the second sensor cells 50 and 52, and as a result, the operation of the finger can still be identified.

Figure 5:
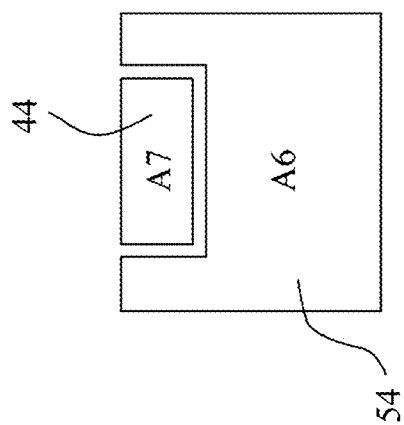
FIG. 5 shows another embodiment for disposing the light-emitting element in FIG. 4.

In other embodiments, the light-emitting element 44 can be disposed adjacent to only one second sensor cell. As shown in FIG. 5, the light-emitting element 44 is disposed adjacent to the second sensor cell 54. The area A6 of the second sensor cell 54 is smaller than the area A1, the area A6 can be higher than or equal to 50% of the area A1. As show in FIG. 5, the area occupied by the light-emitting element 44 and the sensor cell 54 is equivalent to the area A1.

Figure 6:
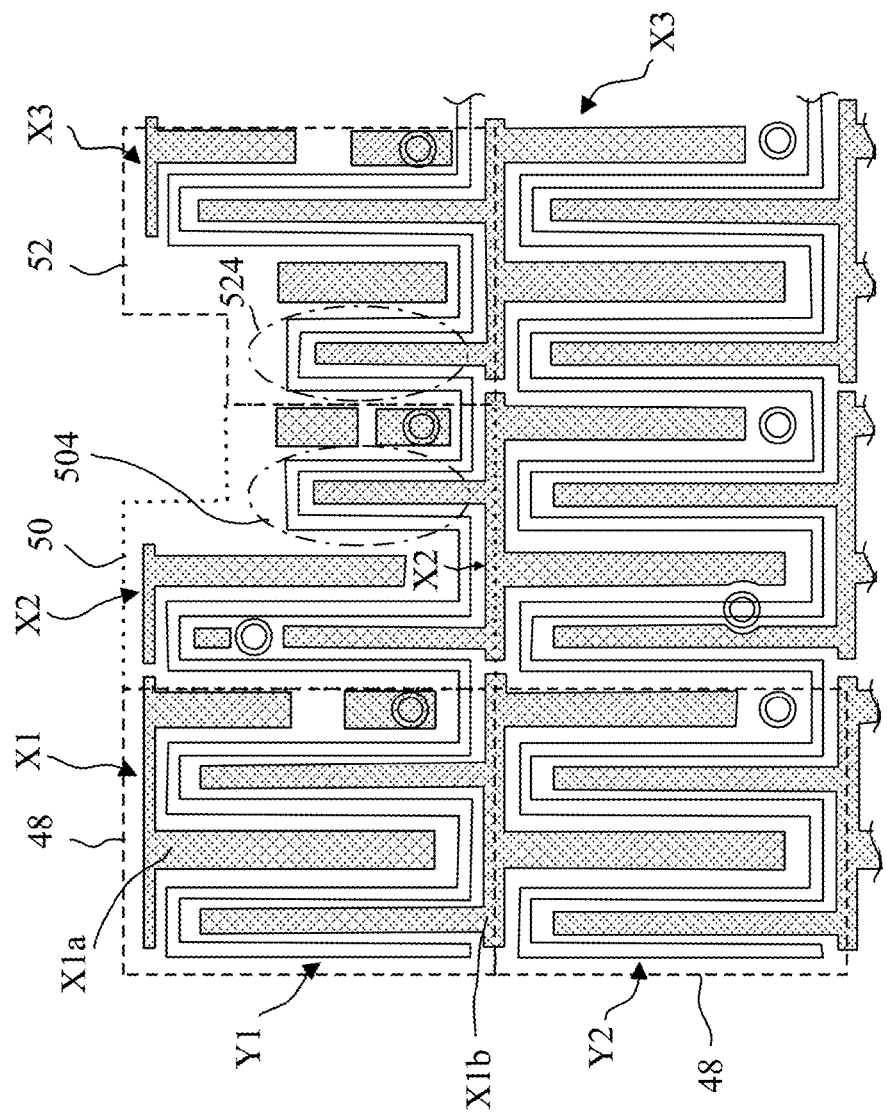
FIG. 6 shows an embodiment of a layout of sensor cells in FIG. 4.

The circuit board 42 comprises a plurality of electrodes X and electrodes Y formed thereon and coupled to the controller 56, and a direction of the electrode X is perpendicular to that of the electrode Y. The electrodes X and the electrodes Y form the sensor cells inside the touch sensing area 46. For convenience of explanation of the first sensor cell 48 and the second sensor cells 50 and 52, FIG. 6 shows electrodes X1 to X3 and electrodes Y1 and Y2 only. The electrodes Y1 and Y2 shown in FIG. 6 are continuous and curved conductor traces, and each of the electrodes X1 to X3 comprises a plurality of trace patterns, and the trace patterns of each electrode X are electrically connected with each other through a wire inside the circuit board 42, such as a wire in a second layer or a third layer of the circuit board 42. Each of the first sensor cell 48 and the second sensor cells 50 and 52 is formed by at least one of the trace patterns of one electrode X and a partial trace of one electrode Y, wherein the at least one of the trace patterns of one electrode X is interleaved with the partial trace of one electrode Y. For example, the first sensor cell 48 is formed by the trace patterns X1$a$ and X1$b$ of the electrode X1 and a partial trace of the electrode Y1. In an embodiment, the controller 56 drives the electrode Y1 and receives a sensing signal of the first sensor cell 48 from the electrode X1, and the controller 56 can calculate a sensing value dV of the first sensor cell 48 according to the sensing signal.

Figure 7:
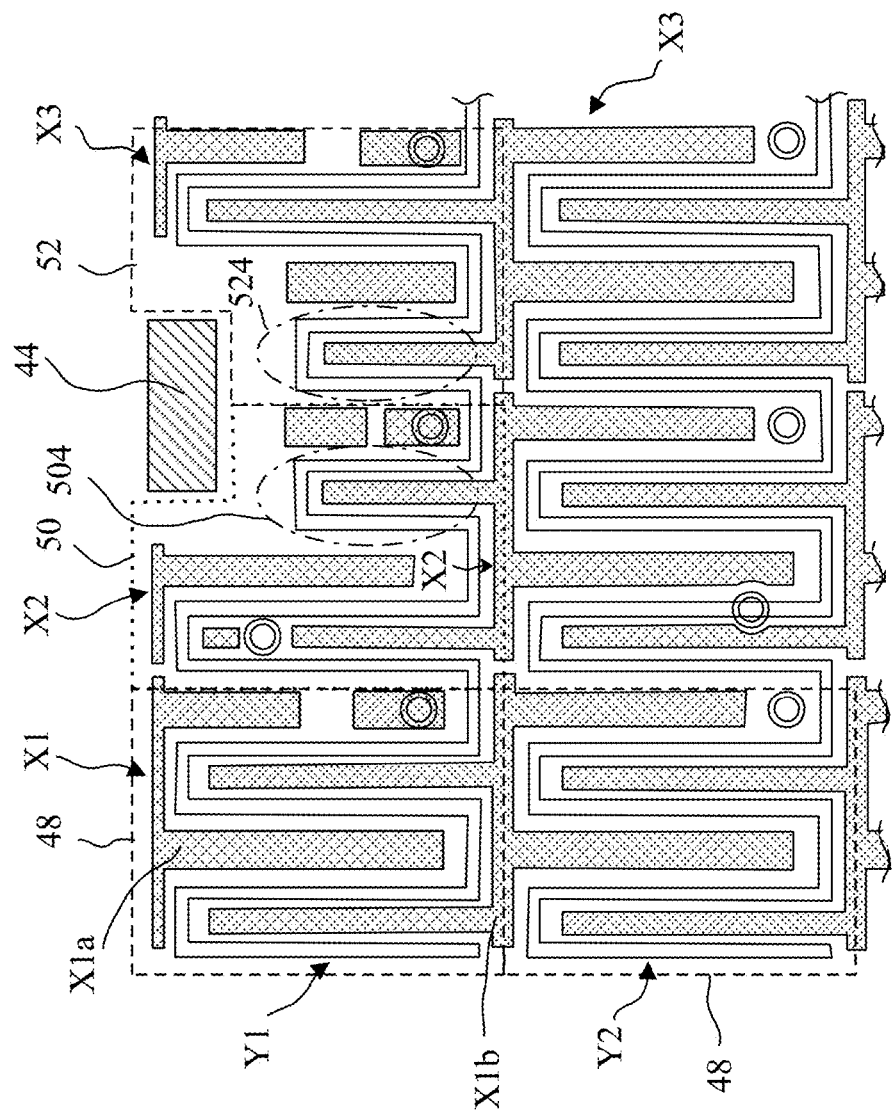
FIG. 7 schematically shows that the light-emitting element is disposed in an area between two adjacent sensor cells of FIG. 6.

The area of the second sensor cell 50 or 52 is different from the area of the first sensor cell 48. The layouts of the sensing traces of the second sensor cells 50 and 52 are different from that of the first sensor cell 48. FIG. 6 shows an embodiment of the sensor cells 48, 50 and 52 of FIG. 4. As shown in FIG. 6, compared with the first sensor cell 48, the lengths of the trace sections 504 and 524 of the second sensor cells 50 and 52 are reduced, so as to reserve the area for mounting the light-emitting element 44. FIG. 7 is a schematic view showing that the light-emitting element 44 is disposed in the second sensor cells 50 and 52 of FIG. 6. As shown in FIG. 7, the light-emitting element 44 is disposed in the reserved area, and does not overlap with the traces of the second sensor cells 50 and 52. FIGS. 6 and 7 just show an exemplary embodiment for convenience of explanation, and in other embodiments, the trace layouts of the first sensor cell 48 and the second sensor cells 50 and 52 can be varied. As shown in FIG. 6, a sum of the trace areas (called the sensing area) of each first sensor cell 48 is substantially the same, and a sum of the trace areas (called the sensing area) of the second sensor cell 50 or 52 is smaller than the sum of the trace areas of the first sensor cell 48.

Each of the sensing areas of the second sensor cells 50 and 52 are smaller than that of the first sensor cell 48, so the sensing value dV generated by each of the second sensor cells 50 and 52 is possibly smaller than the sensing value dV generated by the first sensor cell 48 under the same condition. In order to make the sensing values dV generated by each of the second sensor cells 50 and 52 is the same as that of the first sensor cell 48 under the same touch condition, the controller 56 receiving the sensing value can individually compensate the sensing values dV of the second sensor cells 50 and 52. The controller 56 stores compensation coefficients of the second sensor cells 50 and 52. After receiving the sensing value dV of the second sensor cell 50, the controller 56 can multiply the sensing value by the compensation coefficient, so as to obtain the compensated sensing value dV'. According to the compensated sensing value dV', the controller 56 can determine a touch or calculate the touch position. The compensation coefficient can be determined by experiment. For example, When a conductor (such as a counterweight) with a fixed area touches the first sensor cell 48, the sensing value dV outputted from the first sensor cell 48 is 100, and when the same conductor touches the second sensor cell 50, the sensing value dV outputted from the second sensor cell 50 is 80, and the compensation coefficient of the second sensor cell 50 can be set as 100/80=1.25. With the compensation of using the compensation coefficient of 1.25, the compensated sensing value dV' of the second sensor cell 50 is 80×1.25=100 the same as the sensing value dV of the first sensor cell 48. In another embodiment, the controller 56 can store the compensation coefficients of the first sensor cells 48 and the second sensor cells 50 and 52. The compensation coefficients corresponding to the second sensor cells 50 and 52 are higher than the compensation coefficients corresponding to the first sensor cells 48. With the compensation of using the compensation coefficients, the compensated sensing values dV' generated by the first sensor cells 48, and the second sensor cells 50 and 52 can be substantially the same under the same condition. The controller 56 obtains the sensing values dV of the first sensor cells 48 and the sensing values dV of the second sensor cells 50 and 52, and multiplies the sensing values dV by the corresponding compensation coefficients, respectively, so as to obtain the compensated sensing values dV'. The controller 56 can use the plurality of compensated sensing values dV' to perform the touch determination or calculation of the touch position. In an embodiment, the aforementioned compensation coefficient is higher than or equal to 1. There are more methods for compensating the sensing values dV of the second sensor cells 50 and 52, and there are more methods for determining the compensation coefficients, and the present invention merely provides an embodiment which is easier to understand, and the present invention is not limited by the exemplary embodiment.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A lighting touchpad, comprising:
   a circuit board with a touch sensing area;
   a plurality of first sensor cells and at least one second sensor cell formed in the touch sensing area, wherein each of the plurality of first sensor cells has a first area, each of the at least one second sensor cell has a second area smaller than the first area;
   a light-emitting element disposed in the touch sensing area, and adjacent to the at least one second sensor cell, wherein the light-emitting element does not overlap with the plurality of first sensor cells and the at least one second sensor cell; and
   a controller configured to measure a sensing value of each of the plurality of first sensor cells and a sensing value of each of the at least one second sensor cell, wherein the controller compensates the sensing value of the at least one second sensor cell according to a compensation coefficient;
   wherein, the light-emitting element, the plurality of first sensor cells and the at least one second sensor cell are disposed on the circuit board.

2. The lighting touchpad according to claim 1, wherein the second area is larger than or equal to 50% of the first area.

3. The lighting touchpad according to claim 1, wherein the at least one second sensor cell comprises two adjacent second sensor cells, and the light-emitting element is disposed between the two adjacent second sensor cells.

4. The lighting touchpad according to claim 1, further comprising a light guide plate and a cover plate, wherein the light guide plate is disposed above the circuit board and configured to guide light emitted from the light-emitting element, and the cover plate is disposed above the light guide plate.

5. The lighting touchpad according to claim 4, wherein the cover plate comprises a numeric keyboard pattern, and an area of the numeric keyboard pattern is light transmittable.

6. The lighting touchpad according to claim 1, wherein the circuit board comprises a plurality of first electrodes and a plurality of second electrodes, the plurality of first electrodes are perpendicular to the plurality of second electrodes, and the plurality of first electrodes and second electrodes form the plurality of first sensor cells and the at least one second sensor cell.

* * * * *